Patented Jan. 3, 1939

2,142,864

UNITED STATES PATENT OFFICE 2,142,864

METHOD FOR STORING, TRANSPORTING, AND RESTORING SWEET CREAM

Owen E. Williams, Arlington, Va., dedicated to the free use of the People of the United States No Drawing. Application November 22, 1937, Serial No. 175,771

1 Claim. (Cl. 99—60)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People of the United States to take effect on the granting of a patent to me.

An object of my invention is to prevent the growth of bacteria, and other microorganisms in sweet cream.

Another object of my invention is to facilitate the handling and storage of sweet cream; to effectuate savings in transportation costs, and the restoration thereof.

In the past, the dairy industry has been vitally concerned about the large quantities of inferior cream being utilized in the manufacture of butter. Very often it was found to be extremely sour and yeasty, because of the absence of any effective means for retarding bacterial development and fermentation while held on the farms and during delivery, particularly in hot weather. A practice of neutralization, involving the use of calcium, magnesium and sodium salts, became necessary in order to produce butter from such cream, which was suitable for the market. Furthermore, the quality of butter was usually low and it was evident that the demand for a better grade of butter could not be met when made from this poor quality cream.

Apart from the increasing demand for greater quantities of sweet cream for butter making purposes, there is likewise a greater demand for more and better grades of sweet cream intended for ice cream, and other frozen products.

After considerable study, I considered the possibility of using sodium chloride as a means of preventing bacteria from destroying the initial quality of separator cream. After considerable research, I was convinced that no one had ever used sodium chloride for this purpose. A set of preliminary experiments were started and sweet cream was subjected to normal cellar temperature for storage, using sodium chloride.

It is well known that bacteria cannot grow in a 12% solution of sodium chloride, but since sodium chloride is 26.7% soluble at 70° F., it was necessary in my first tests to use different concentrations. I found that a 12% solution on the water basis, was favorable. Therefore, it was considered advisable to conduct similar tests to determine the practicability and advantage of salting fresh cream, intended for butter making, on a larger scale.

A series of duplicate tests were made with salted cream held at both cellar and room temperatures for periods of one and two weeks. The salted cream held at cellar temperature was kept in ordinary milk cans, while that held at room temperatures was kept in enameled tanks. After all the tests had been completed, a sample of sweet cream butter was obtained from a regular churning, representing normal factory butter, for a control, and two days later all the samples were scored.

These tests proved to be so remarkable and encouraging that plans were immediately made to conduct another practical test of applying sodium chloride to sweet cream on the farms in cooperation with a creamery. The cream was normally collected twice a week on routes covering about 25 miles. These routes were located at other towns and the cream would be shipped by train to the creamery. Collections of salted cream were made once a week. The estimated savings due to the elimination of one collection netted the farmers about 6 cents a pound more for their butter fat.

From these tests, I learned that the quality of butter made from salted cream held for both one and two weeks at room temperature was, in most instances, equal to the butter produced from fresh sweet cream, and in the second tests salted cream collected once a week from the farms, produced butter of much better quality than did the unsalted cream that was collected and sent to the creamery twice a week.

I have found that sweet cream can be kept in a fair degree of preservation by the use of sodium chloride during short periods, when it is practically impossible to retard the growth of lactic acid producing bacteria and other detrimental types of bacteria without adequate refrigeration.

My method of removing the sodium chloride and recovering the cream is done by centrifugal force, and is extremely beneficial, since it does not destroy the emulsion, as was formerly done in the aforementioned churning tests for producing butter. Sodium chloride can be removed from salted sweet cream without damage to the cream. It is apparent that the adoption of the practice of adding sodium chloride to fresh sweet cream will become beneficial not only to the dairymen on the farms, but to creamerymen, cream station operators, and ice cream manufacturers. This cream can be kept and transported at ordinary room temperature, thereby saving refrigeration costs.

In the storage transportation of salted cream, I recommend it to be placed in containers suitable to avoid corrosion and other deleterious causes. I have found that the commercial type milk container may be used when lined with any material that will keep the salted cream out of contact with the metal, such a material, for example, being cellophane.

In the practical application of my invention, I may add, to the cream container, sodium chloride, the quantity, of course, depending upon the richness and quantity of the cream and length of time it is to be stored. For example, if a dairyman expects to ship 5 gallons of 40% cream after 7 days' collection, he should first place in the container not more than 3 pounds of sodium chloride, and stir each time fresh cream is added. In cases where the cream collected is of a lower fat content, more sodium chloride may be added.

When the salted cream has reached destination and it is desired to produce a normal sweet cream having a fat content of 40%, I recommend the use of equal parts of either fresh whole milk, skim milk, or milk diluted with water, then heating the mixture to about 120° F., the while separating, by means of any commercial type centrifugal separator, the cream from the milk and salt, which produces a plastic cream (approximately 80% fat). There should be added to this thick cream equal parts of skim milk, or 10 parts whole milk (averaging 4% fat) to 9 parts of the 80% cream. This thick cream is thereby diluted or restored to its original 40% fat content, and is now ready for pasteurization, and will contain less than 0.5 of 1% salt, or barely noticeable to the taste. It is also in suitable condition to be made into ice cream, or for the production of cream suitable for table use, by the addition of the necessary amount of skim or whole milk. After pasteurization, the temperature of the cream should be lowered, and kept at temperatures that are now employed for the keeping of cream.

Another practical application of my invention may apply in the production of sweet cream butter. For example, pasteurizing the salted cream containing approximately 7% salt without first separating the cream from the milk and salt, and thence following the usual butter making practices. By this method the salt is removed from the butter and goes into the buttermilk which is suitable for animal feeding. Since practically all the salt is carried in the buttermilk, it is necessary to add salt to the butter in the usual manner.

Still another practical application of my invention may apply where creamerymen, or other commercial plants, desire to market their sweet cream in distant localities. For example, add to pasteurized sweet cream having substantially 40% butter fat, not more than 7% sodium chloride. This will prevent bacteria development when the cream is shipped without referigeration. This mixture can be held at destination provided it is frequently agitated. When it is proposed to remove the salt, the procedure as outlined above should be followed.

Still another practical application of my invention may apply where farmers, or cream shippers, desire to prevent cream from freezing during shipment or storage. For example, add to sweet cream having substantially 40% butter fat, approximately 7% sodium chloride. The sweet cream so treated can then be stored or shipped at temperatures far below freezing, and it will remain in a fluid condition, and its physical properties, I have found, will not be changed at 0° F.

A number of tests have been made with salt added cream in the production of ice cream, and for cream intended for household purposes, with satisfactory results. For example, ice cream containing 16% fat was made from salted sweet cream containing 40% fat after it had been preserved with 7% salt and held at room temperature for 8 days. Ice cream was then made and no objectionable flavors, or the presence of salt, were detected.

Coffee cream containing 21% fat was also produced from the same cream, which compared favorably with fresh cream.

Having thus described my invention, what I claim for Letters Patent is:

In the storage, transportation and subsequent preparation for market of fresh sweet cream, the method comprising the steps of adding sweet cream to a receptacle containing substantially 7% sodium chloride, maintaining the mixture at substantially room temperature, adding subsequent quantities of sweet cream thereto, agitating the mixture each time fresh sweet cream is added, thence transporting the salt added cream to destination at ordinary room temperature, thence adding milk and subjecting the mixture to a temperature of approximately 120° F., the while recovering the cream from the salt and added milk, thereby producing a plastic cream, then adding fresh milk in the proportion sufficient to restore the cream to the required butter fat content, and thence subjecting this mixture to pasteurization, and lowering the temperature.

OWEN E. WILLIAMS.